US010412789B2

(12) United States Patent
Henke et al.

(10) Patent No.: US 10,412,789 B2
(45) Date of Patent: Sep. 10, 2019

(54) METHOD FOR REGULATING A COOKING PROCESS

(71) Applicant: Cuciniale GmbH, Lindau (DE)

(72) Inventors: Holger Henke, Rorschacherberg (CH); Tobias Flämig-Vetter, Esslingen (DE); Philipp Ochtendung, Wangen (DE)

(73) Assignee: Cuciniale GmbH, Lindau (DE)

(*) Notice: Subject to any disclaimer, the term of this patent is extended or adjusted under 35 U.S.C. 154(b) by 886 days.

(21) Appl. No.: 14/786,669

(22) PCT Filed: Apr. 22, 2014

(86) PCT No.: PCT/EP2014/058137
§ 371 (c)(1),
(2) Date: Oct. 23, 2015

(87) PCT Pub. No.: WO2014/173897
PCT Pub. Date: Oct. 30, 2014

(65) Prior Publication Data

US 2016/0088685 A1 Mar. 24, 2016

(30) Foreign Application Priority Data

Apr. 23, 2013 (DE) ........................ 10 2013 104 107

(51) Int. Cl.
*H05B 6/06* (2006.01)
*H05B 6/08* (2006.01)
(Continued)

(52) U.S. Cl.
CPC .............. *H05B 6/062* (2013.01); *A47J 27/62* (2013.01); *H05B 2213/07* (2013.01)

(58) Field of Classification Search
CPC ....... H05B 6/062; H05B 2213/07; A47J 27/62
(Continued)

(56) References Cited

U.S. PATENT DOCUMENTS 3,742,178 A * 6/1973 Harnden, Jr. ......... A47J 27/002 219/385
3,781,506 A * 12/1973 Ketchum ............... H05B 6/062 219/626
(Continued)

FOREIGN PATENT DOCUMENTS

DE 19714701 A1 10/1998
DE 10262141 B4 10/2009
(Continued)

OTHER PUBLICATIONS

International Search Report from International Application No. PCT/EP2014/058137 dated Jul. 10, 2014.
(Continued)

*Primary Examiner* — Quang T Van
(74) *Attorney, Agent, or Firm* — Marshall, Gerstein & Borun LLP

(57) ABSTRACT

The invention relates to a method for regulating a cooking process using an item of cookware having inductive properties on a cooking area, wherein a coil is arranged as part of an LC resonant circuit in the region of the cooking area and the natural frequency of the LC resonant circuit is measured repeatedly or continuously. The invention also relates to a cooking apparatus having at least one cooking area, a temperature sensor, a power controller, an LC resonant circuit having a coil, which is arranged in, around or in the region of the cooking area, and a controller, which is connected to the temperature sensor and a unit for measuring the frequency of the LC resonant circuit and which is programmed to carry out method, wherein the controller has access to a memory for storing the mathematically determined parameter function or vector function.

23 Claims, 3 Drawing Sheets

(51) Int. Cl.
*G01K 17/00* (2006.01)
*A47J 27/62* (2006.01)

(58) Field of Classification Search
USPC ............... 219/627, 626, 667, 621, 385, 501; 220/573.1, 592.22; 340/870.17, 870.31, 340/870.39; 374/141
See application file for complete search history.

(56) References Cited

U.S. PATENT DOCUMENTS

| | | | | |
|---|---|---|---|---|
| 4,377,733 | A * | 3/1983 | Yamaguchi ............ | G01K 1/024 219/516 |
| 2011/0120989 | A1 | 5/2011 | Schilling et al. | |
| 2014/0086274 | A1 | 3/2014 | Henke | |
| 2014/0158678 | A1 * | 6/2014 | Thomann ............. | H05B 1/0266 374/101 |

FOREIGN PATENT DOCUMENTS

| | | | |
|---|---|---|---|
| EP | 1037508 | A1 | 9/2000 |
| EP | 1420613 | A2 | 5/2004 |
| EP | 2094059 | A2 | 8/2009 |
| EP | 2330866 | A2 | 6/2011 |
| WO | WO-2012092683 | A2 | 7/2012 |
| WO | WO-2012149997 | A1 | 11/2012 |

OTHER PUBLICATIONS

International Preliminary Report on Patentability from International Application No. PCT/EP2014/058137 dated Oct. 27, 2015.

* cited by examiner

METHOD FOR REGULATING A COOKING PROCESS

FIELD OF THE INVENTION

The invention relates to a method for regulating a cooking process using an item of cookware having inductive properties on a cooking area, wherein a coil is arranged as part of an LC resonant circuit in the region of the cooking area and the natural frequency of the LC resonant circuit is repeatedly or continuously measured. The invention also relates to a cooking apparatus for carrying out such a method.

The invention describes a method with which the energy feed for different items of cookware (such as saucepans and frying pans) is regulated depending on the electromagnetic and thermal properties of said items and under consideration of the properties of foods to be cooked and the progress of the cooking thereof.

RELATED TECHNOLOGY

Automatic cooking is becoming increasingly important. All previous methods with a predominantly 3-dimensional energy feed or an energy feed on all sides into the food, for example in an oven, or with a predominantly 2-dimensional energy feed or an energy feed on one side into the food, for example in pots, grills or pans, are based on a fixedly defined surrounding environment. In the case of cook tops for domestic use, however, quite different items of cookware (for example pots or pans) are used.

When applying a fixedly defined heating energy to such items for a fixedly predefined time, this item, depending on design, demonstrates very different behaviour both during the heating and during the cooking. This item in a domestic environment is normally not equipped with a temperature measuring unit. During cooking, it is additionally not expedient to provide an external temperature measuring device in the item of cookware, as described in patent application. EP 1 037 508 A1.

Different methods have thus been developed in order to measure and to regulate the temperature of items of cookware having inductive properties. A method is described in U.S. Pat. No. 3,742,178 in which the temperature dependency of the permeability of the item of cookware is measured by means of a measuring resonant circuit. The temperature signal obtained therewith, however, is a non-linear, indistinct, and non-reproducible function. A disadvantage of this is that these methods function only with special items of cookware.

These disadvantages are to be remedied with U.S. Pat. No. 3,781,506, in which the temperature signal is modified substantially linearly with the surface temperature by a very complex measuring resonant circuit. A disadvantage of this method is that it functions only for one material group (here only for enamelled steel items of cookware) and can never cover the wide range of the most common modern items of cookware. In addition, the temperature signal is obtained under standardised conditions. A disadvantage of this is therefore also that this method can then be implemented only using a special item of cookware and functions always under the same conditions, which in actual, often hectic, everyday kitchen use can be provided only with difficulty.

This disadvantage is to be eliminated with EP 2 094 059 A2 by the calibration of the items of cookware with the aid of temperature measuring locations mounted in the stove top. Here, the temperature measured with a time delay is compared with the electromagnetic properties of the item of cookware. This method functions only at the start when boundary conditions are well defined and observed.

Also with the method known from DE 102 62 141 B4 only the frequency-temperature characteristic curves of certain items of cookware that are heated at certain powers are gauged, such that any deviation results in an incorrect temperature determination. WO 2012/149997 A1 discloses a method for determining the puncture angle of a core temperature sensor. A regulated inductive heating system is known from DE 197 14 701 A1, in which the power input of a vessel to be heated is determined at high frequency and compared with a target value in order to terminate the heating process in the event of inadmissible loading of the induction coil.

The methods proposed by EP 2 330 866 A2 are just as unsuitable for determining a reproducible temperature under these conditions, since the multiplicity of the different structures of different items of cookware do not provide a distinct function for the temperature signal.

A disadvantage of the known methods is thus that under actual conditions with different types of items of cookware, which are usually used, a reproducible and sufficiently accurate determination of the temperature of the surface of the item of cookware is not possible.

SUMMARY OF THE INVENTION

The object of the invention is therefore to overcome the disadvantages of the prior art. In particular, a method for regulating a cooking process is to be provided, in which a determination of the surface temperature of the item of cookware or of the content thereof is possible even under different external conditions and at any moment during a cooking process and with use of different types and designs of items of cookware, such that the cooking process can be controlled and regulated even without a direct measurement of the temperature. The method should enable a use of the measurable parameters accessible via the resonant circuit of inductive hobs in order to determine the temperature, even with items of cookware and boundary conditions that differ significantly from one another.

The objects of the invention are achieved by a method for regulating a cooking process using an item of cookware having inductive properties on a cooking area, wherein a coil is arranged as part of an LC resonant circuit in the region of the cooking area and the natural frequency of the LC resonant circuit is repeatedly or continuously measured, said method having the following method steps A) alternately heating the cooking area with at least two different target powers, wherein during this process the temperature at the bottom of the item of cookware is repeatedly or continuously measured using a temperature sensor and the frequency of the LC resonant circuit is repeatedly or continuously measured;

B) determining a parameter function or vector function from the measured temperature profile over time of the temperature sensor and from the frequency of the LC resonant circuit depending on the time and depending on the least two target powers; and C) conducting the cooking process depending on the parameter function or vector function determined in method step B) and depending on the frequency of the LC resonant circuit and/or the change over time of the frequency of the LC resonant circuit.

In accordance with the invention a conducting of the cooking process is to be understood to mean the control or regulation of the cooking process. Here, the frequency of LC resonant circuit is preferably measured in accordance with the invention, the measurement is mathematically processed with the previously determined parameter function or vector function, and the result is used to control or regulate the cooking process. The measurement of the frequency of the LC resonant circuit, the mathematical processing, and the control or regulation of the cooking process are particularly preferably performed continuously or repeatedly in discrete time steps.

A cooking process describes a sequence of target powers and resultant target temperatures of the item of cookware or of the food to be cooked or cooking medium in the item of cookware with associated cooking times and/or a sequence of target temperature ramps or target temperature profiles and an end time. The at least two target powers with which the cooking areas are heated alternately are preferably regulated directly in succession. A switch-off of the cooking areas, or a target power of zero or another target power or a certain target power "ramp" does not have to be set between the target powers.

Any non-metal cooking area or stove top is suitable for carrying out methods according to the invention. Metal stove plates are at least unsuitable when they shield the magnetic field of the coil of the LC resonant circuit in the direction of the item of cookware. Induction stove plates or induction cooking zones are particularly well suited for carrying out methods according to the invention.

In the case of methods according to the invention an induction cooking zone may preferably be used as a cooking area, and the induction coil of the induction cooking zone or a separate coil may preferably be used as a coil.

Additional components for constructing the LC resonant circuit can be avoided as a result. This construction is therefore provided particularly easily and economically.

It is also proposed, with the alternating heating of the cooking area, for at least one first target power to be selected from 50% to 100% of the nominal power of the cooking area and for at least one second target power to be selected up to at most 25% of the nominal power of the cooking area, preferably up to at most 15% of the nominal power of the cooking area. Within the sense of the present invention the first target power and the second target power are then the two previously mentioned target powers according to the invention, or two of the previously mentioned at least two different target powers, with which the cooking area is heated alternately. This is also true hereinafter whenever reference is made to two target powers.

With these two different target powers, two reference points are selected, which, for a subsequent control, are particularly well suited for controlling the cooking process on account of the different states during the power feed.

In addition, the temperature sensor after method step B) may no longer be used to measure the temperature of the surface of the item of cookware.

Here, in accordance with the invention, the temperature sensor is preferably detachable from the item of cookware and is removed from the item of cookware after method step B) or is placed in the food to be cooked. In accordance with the invention an instruction may also be provided to the user of the cooking apparatus, said instruction asking the user to remove the temperature sensor or to place said sensor in the food to be cooked.

The control may be implemented following the calibration by the measurement of the frequency of the LC resonant circuit. The temperature sensor may accordingly be used advantageously for other measurements used in order to control the cooking process.

In accordance with a development of the invention it is proposed for a first target power to be held longer than a second target power, wherein the first target power is selected to be higher than the second target power, in particular at least three times as high, and wherein the first target power is preferably held between 30 and 120 seconds and the second target power is held between 15 and 60 seconds.

Due to the large differences between the two target powers, it can be ensured that the data used for calibration can be portrayed in a large spectrum with good accuracy for the different temperatures occurring later during the cooking process.

Furthermore, it is proposed for the profile over time of the temperature of the surface of the item of cookware measured using the temperature sensor, the profile over time of the measured power of the cooking area, the profile over time of the target power of the cooking area, the profile over time of the frequency of the LC resonant circuit, and/or the first and/or the second time derivative of one or more of these variables to be used in order to determine the parameter function or vector function.

It may also be that the profile over time of the measured power of the cooking area, the profile over time of the target power of the cooking area, the profile over time of the frequency of the LC resonant circuit, and/or the first and/or the second time derivative of one or more of these variables is/are used in order to manage the cooking process depending on the frequency of the LC resonant circuit.

These variables are particularly well suited for conducting a cooking process in order to achieve the desired target result of the product to be cooked and/or a desired end time of the cooking process. Such variables are also particularly well suited for the definition of the parameter function or vector function.

Furthermore, each determined parameter function or vector function may be assigned to an item of cookware or a class of cookware, and the cooking process may be managed depending on the parameter function or vector function, and this may be preferably stored together with an identifier for the item of cookware or the class of cookware in an electronic memory.

Since the item of cookware has a decisive influence on the vector function or the parameter function, it is particularly expedient and advantageous in accordance with the invention to assign the calibrations to certain items of cookware and to store this for future cooking process control.

It is also proposed in accordance with the invention for the item of cookware to be heated after method step B) to a first target temperature, wherein the temperature sensor and/or the frequency of the LC resonant circuit and/or the parameter or vector function for determining the current temperature of the item of cookware is/are used for this purpose.

Here, different values may be stored for the frequency of the LC resonant circuit or a variable calculated or derived therefrom, and the stored values or the variable may be used as a reference for subsequent regulations on the basis of the frequency of the LC resonant circuit.

Each of these values corresponds here ultimately to an input of energy at a respective moment in time, which input is to be kept constant over a certain period of time depending on the progress of the cooking process.

As a result of this approach the method is improved in an ongoing manner by continuous application. Due to the data collected in this way, the quality of the measurement can also be improved for cooking apparatuses as a whole by transferring the data from one cooking apparatus to other cooking apparatuses.

The temperature sensor, after reaching the target temperature, may particularly preferably be removed from the item of cookware or placed in a food to be cooked, or an instruction may be provided to the user of the cooking apparatus, asking the user to remove the temperature sensor or to place the temperature sensor in the food to be cooked.

The temperature sensor by way of example may thus also be used as a core temperature sensor in order to achieve an improvement of the control of the cooking process.

In the event of a maintaining phase of the cooking process, in which the temperature of the item of cookware is to be kept constant, a 2-point regulation or a multi-point regulation may also be used, wherein the at least two target powers in method step A) are used as power stages for the 2-point regulation or multi-point regulation and the temperature is determined a number of times by calculation with the parameter function or the vector function from the measured frequency of the LC resonant circuit.

A 2-point regulation provides a simple and therefore efficient approach for carrying out methods according to the invention.

In accordance with a development of the invention it is proposed to determine, by evaluation of the frequency of the LC resonant circuit with the parameter function or the vector function, whether a food to be cooked or a cooking medium is introduced into the item of cookware during the cooking process, whether the food to be cooked is burning, whether the cooking medium is overcooking, whether the position of the item of cookware on the cooking area has changed and/or the manner in which the food to be cooked is arranged physically in the item of cookware, and to control the cooking process in accordance with this determination and/or to provide an instruction to the user of the cooking apparatus.

The frequency of the LC resonant circuit can be evaluated by way of example in that an overshoot or undershoot of a fixed tolerance must occur in order to determine one of the aforementioned states and in order to then control the cooking process. A food to be cooked or a cooking medium changes the thermal load in the item of cookware, such that the change to the parameter function or the vector function is a measure for the thermal load and therefore for the quantity and temperature of the introduced food to be cooked or cooking medium. The quantity or starting temperature of the food to be cooked is thus determined indirectly and can be used for the corresponding readjustment of the energy feed.

This results in additional possibilities for identifying extreme situations during the cooking process, which are particularly suitable for controlling the cooking process or for alarm signals and are helpful for the user.

In accordance with a preferred embodiment of the invention the cooking process may also be selectively controlled by an adjustment of the power of the cooking area depending on the progress of the cooking process, a target time and/or the desired result, wherein, in order to determine the temperature of the item of cookware, the frequency of the LC resonant circuit is used with application of the parameter function or the vector function for calculation of the temperature.

In accordance with the invention the energy input into the food may thus be controlled selectively depending on the progress of the cooking process and the desired result. Here, the progress of the cooking process may also be "frozen" below the cooking point with the aid of the temperature probe in order to achieve a cooking time as accurately as possible, i.e. in order to achieve the desired cooking result at the desired target time.

In accordance with a development of the invention it is proposed for the method with method steps A) and B) to be used to calibrate the item of cookware, wherein the parameter function or the vector function is stored, and when an item of cookware is placed on the cooking area with method steps A) and B) a known item of cookware is identified on the basis of the parameter function or vector function and the previously stored parameter function or vector function is used in order to manage the cooking process during the evaluation of the frequency of the LC resonant circuit in method step C).

Due to the automatic identification of the item of cookware, known calibrations can be used without these having to be input by the user.

The objects of the invention are also achieved by a cooking apparatus having at least one cooking zone, in particular at least one induction cooking zone, a temperature sensor, a power controller, an LC resonant circuit having a coil, which is arranged in, around or in the region of the cooking area, and a controller, which is connected to the temperature sensor and a unit for measuring the frequency of the LC resonant circuit and which is programmed to carry out a method according to one of the preceding claims, wherein the controller has access to a memory for storing the mathematically determined parameter function or vector function.

Here, the cooking apparatus may have a temperature measuring probe, which is connected wirelessly to the controller and at the tip of which the temperature sensor for measuring the surface temperature of an item of cookware is arranged.

The invention is based on the surprising findings that, by changing or wobbling the power or the target power of the cooking area, it is possible to determine a function (vector function or parameter function) between the surface temperature of the bottom of the item of cookware and the frequency of an LC resonant circuit, of which the inductance is changed by the temperature-dependent magnetic permeability of the item of cookware, wherein the determined function during the subsequent course of the same cooking process or of a chronologically separate cooking process can be used to reliably manage the cooking process on account of the function, which is a measure for the surface temperature of the item of cookware or of the bottom of the item of cookware.

It has been found with the invention that in the practical use of methods as taught for example by EP 2 094 059 A2, the change to the electromagnetic properties of the overall item of cookware/resonant circuit system and the temperature of the item of cookware are not taken into consideration. It has also been found within the scope of the invention that the electromagnetic properties of the overall item of cookware/resonant circuit system and the temperature of the item of cookware are influenced by different quantities of the food to be cooked, starting temperatures, cooking processes (for example roasting, boiling) and the change thereto over time. A consideration of these parameters would make the calibration according to EP 2 094 059 A2 very complex and therefore impracticable. The method according to the invention is instead carried out particularly easily and without great additional effort.

In order to carry out the invention a cooking apparatus having at least one cooking zone (at least one cooking area) is used and has a heating unit, ideally an induction heating unit. The cooking apparatus additionally has at least one separate measuring resonant circuit (LC resonant circuit) with coupled evaluation electronics, which measures the temperature-dependent permeability of the item of cookware. It is advantageous in this respect to continuously measure the change to the oscillation period on account of the change to the impedance and resistance in the measuring circuit. The evaluation electronics delivers a continuous temperature signal $T_{pwm}$, which is dependent on the set target power $P_s$ of the cooking area, the effective power actually applied by the item of cookware $P_{act}$, the ambient temperature $T_u$, the starting item of cookware temperature $T_{pot}$, and the structure and material composition of the item of cookware.

The temperature is measured by the use of a preferably wireless temperature measuring probe, which measures the temperature at the surface of the item of cookware $T_{pot}$ during the heating without food to be cooked. Later, this temperature measuring probe can also be inserted into the food to be cooked (for example may pierce said food) in order to determine and track further parameters of the food to be cooked and the progress of the cooking process.

For the structure of the temperature measuring probe it is advantageous here when a suitable temperature sensor is placed directly in the tip of the temperature measuring probe.

So that the temperature regulation delivers sufficiently good results with any item of cookware and at any time, the following features are particularly beneficial in accordance with the invention:

Heating the item of cookware with alternating heating and cooling phases (with alternating different target powers of the cooking area), wherein one or more target powers $P_s$ (ideally 2 or 3) are defined for each phase and the respective duration is either fixedly defined or is regulated in a variable manner. During the heating phase, target powers between 50% and 100% of the nominal power of the respective cooking zone and for the cooling phase between 0 and 15% are particularly expedient.

During the first heating cycle—consisting of a heating and cooling phase—the respective time is fixedly predefined. In order to avoid an overheating, times between 30 to 120 seconds for the heating phase and from 15 to 60 seconds for the cooling phase are particularly advantageous.

During the cycle the temperature signal $T_{pwm}$ is measured periodically (i.e. repeatedly at identical intervals) with a fixed sampling rate of at least 1 Hz, preferably of 2 Hz. At the same time, a curve sketching takes place, with which key parameters or vectors such as the first and second time derivative of $T_{pwm}(t)=f(t, P_1(t), P_{act}(t), T_u(t), T_{pot}(t))$, are determined continuously or periodically. The function $T_{pwm}(t)=f(t, P_1(t), P_{act}(t), T_u(t), T_{pot}(t))$ can be determined here and used as parameter function with the parameters t, $P_1(t)$, $P_{act}(t)$, $T_u(t)$, $T_{pot}(t)$ or as vector function with the vectors t, $P_1(t)$, $P_{act}(t)$, $T_u(t)$, $T_{pot}(t)$. The parameters or the vectors are preferably determined linearly independently of one another. It is also possible, however, to determine or to use the parameters or the vectors dependently on one another.

The temperature profile $T_{pot}$ is recorded in parallel.

The respective item of cookware is described by the following, distinct, multi-dimensional vector function $\vec{T}_{pot}(t)$:

$$\vec{T}_{pot}(t) = f\begin{bmatrix} T_{pwm}(t_0, P_S(t_0)) \\ f(T_{pwm})':\ t_n, t_{n+1}, P_1 \\ f(T_{pwm})':\ t_n, t_{n+1}, P_i \\ f(T_{pwm})'':\ t_n, t_{n+1}, P_i \\ P_{act}(t) \\ c_{pot}(t) \end{bmatrix}$$

wherein t is the time at the moments n or the subsequent moments n+1, $P_s$ is the predefined target power for the periods i=1 to j, $P_{act}(t)$ is the currently effectively applied power of the induction generator, and $c_{pot}$ is the determined specific heat of the empty item of cookware. The specific heat is determined here by the formula $$c_{pot} = \int_{t=0}^{t} P_{act}(t)dt / (T_{pot}(t) - T_{pot}(t=0)).$$

The function $T_{pot}(t)$ can also be formulated, instead of as a six-dimensional vector (6-tuple), as a parameter function of form:

$$\vec{T}_{pot}(t)=a\cdot T_{pwm}(t_0,P_S(t_0))+b\cdot f(T_{pwm})':t_n,t_{n+1},P_1+ c\cdot f(T_{pwm})+:t_n,t_{n+1},P_i+d\cdot f(T_{pwm})'':t_n,t_{n+1},p_i+e\cdot P_{act}(t)+f\cdot c_{pot}(t)$$

with six linearly independent terms a, b, c, d, e and f. In theory, mixed terms can also be supplemented in order to be able to take into account the mutual dependencies.

Following the online determination and storage in the microcontroller, the item of cookware is heated to the respective target temperature. This can be implemented either using the temperature measuring probe or without the temperature measuring probe by means of the vector function parameter function or also by means of characteristic curves already stored.

When the desired target temperature is reached, the value for $T_{pwm}(T_{pot})$ valid at this moment is stored and then used as control variable.

In order to keep the temperature at the surface of the item of cookware constant at least for a certain time, a known control algorithm, for example a 2-point controller or also a PID controller is used. In the case of the 2-point controller the two power stages for the target power $P_i$ are used, which match with the target powers of the first heating cycle. Due to this short-term pulsing according to the invention of the target power $P_i$, $T_{pot}(t)$ can be described as a distinct function of $T_{pwm}(t)$ and thus ensures a good regulation of the surface temperature $T_{pot}$ of the item of cookware.

Due to the addition of a thermal load, for example by inserting foods to be cooked or introducing a cooking medium (for example water, oil or fat) into the item of cookware, the temperature of the item of cookware falls, and therefore the measured permeability of the item of cookware also changes. Here, the more food to be cooked or cooking medium that is introduced or the colder is the food to be cooked or the cooking medium, the more heavily the temperature drops. The temperature signal changes accordingly. With the described controllers and under consideration of the stored vector function $\vec{T}_{pot}(t)$ or parameter function $T_{pot}(t)$, the surface temperature $T_{pot}$ of the item of cookware can be raised again to the original level and held at this level for a period of time that is optimal for the respective food.

Other surface temperatures can also be regulated selectively by means of the vector function or the parameter function. This is then particularly expedient for example when the food to be cooked is to be cooked at a lower or higher temperature level for a longer time.

It is also possible to identify during the cooking process by means of the temperature vector or the parameters whether the user has added further ingredients for example in accordance with a recipe or in accordance with a request by the operating unit.

A further expedient application of the method according to the invention is that of regulating the energy feed in accordance with the properties of the food. For this purpose, a multi-point core temperature probe is used. With the accurate knowledge of the current temperature profile in the food to be cooked and the deviation from an ideal target profile, the energy feed can be regulated under consideration of the individual properties of the item of cookware. Particularly optimal cooking results are therefore possible.

An extension of this application lies in accelerating or delaying the cooking process in order to achieve a previously input target time. This is not a pure maintaining of temperature at the end of a cooking process, since this leads to a reduction of the quality of the meal, as is known.

Furthermore, It is possible to identify with the temperature vector whether the item of cookware is still in the correct position. This is then relevant when the item of cookware is shifted for example by stirring ingredients, meaning that a uniform input of heat is no longer possible.

A further expedient application is the detection of an overcooking of the cooking medium or of a burning of the food to be cooked. In this case the temperature signal rises above the level of a sensible tolerance for the calculated characteristic curve or the calculated vector field. This can be automatically identified by means of corresponding algorithms, and the target power of the cooking area can be reduced accordingly.

BRIEF DESCRIPTION OF THE DRAWINGS

Exemplary embodiments of the invention will be explained hereinafter on the basis of three schematically illustrated figures and graphs, although the invention is not limited hereto. In the drawings.

DETAILED DESCRIPTION

Figure 1:
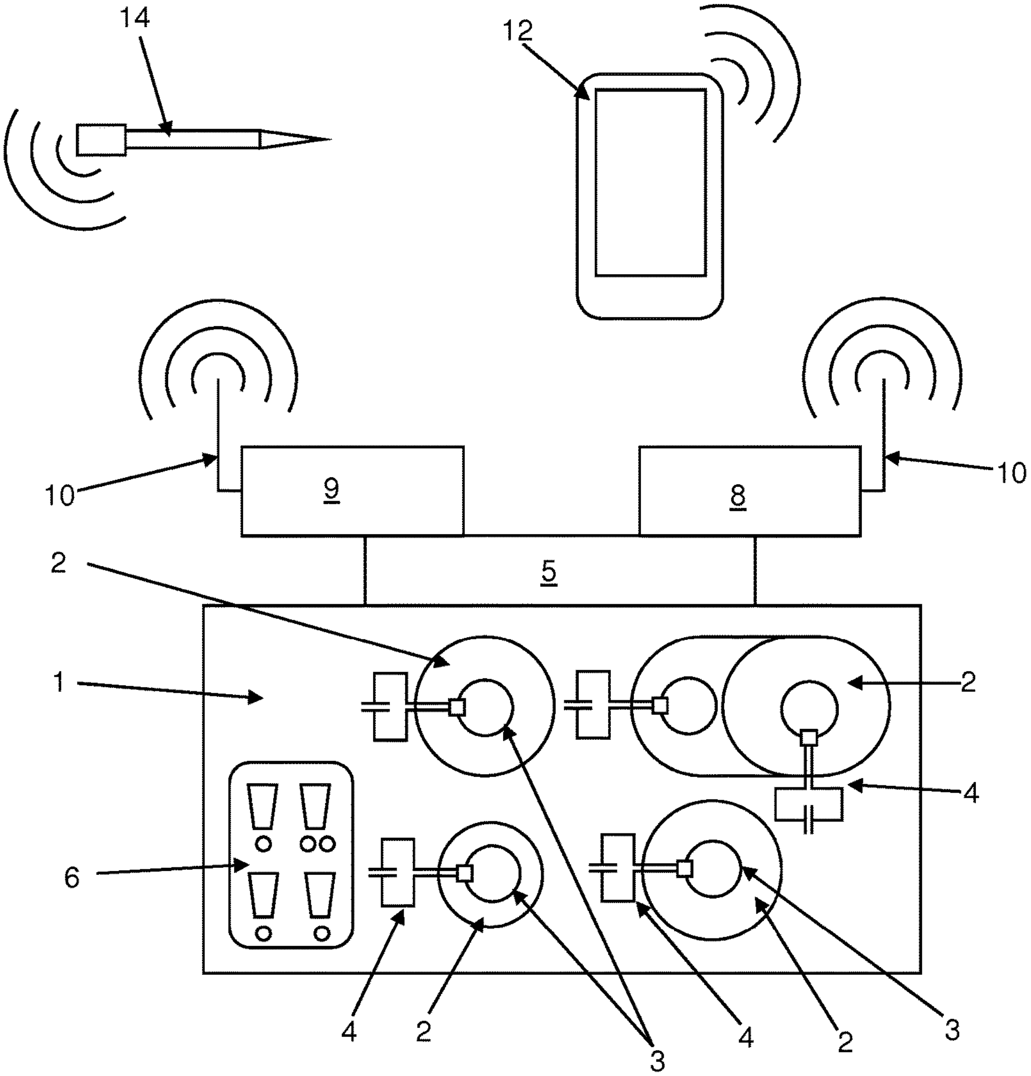
FIG. 1: shows a schematic illustration of a cooking apparatus according to the invention for carrying out a method according to the invention.

FIG. 1 shows a schematic illustration of a cooking apparatus according to the invention, which is suitable for carrying out a method according to invention and on the basis of which a method according to the invention will be explained.

In order to carry out the invention, a cooking apparatus 1 having at least one cooking area 2 or cooking zone 2 is used, which cooking area or zone can be heated via a heating unit, ideally via an induction heating unit. The energy feed for each cooking area 2 is regulated here individually by a built-in microcontroller.

In each cooking area 2, a coil 3 or induction coil 3 is embedded, which is mounted separately from the induction heating coil of the cooking area 2. The coils 3 are parts of separate LC resonant circuits 4 comprising the coil 3 for each cooking area 2 with coupled evaluation electronics 5, which measures the temperature-dependent permeability of the item of cookware (not shown). Besides the coil 3, the LC resonant circuit 4 also has a capacitor in the form of a condenser, which is electrically connected to the coil 3 and is illustrated schematically in FIG. 1.

The evaluation electronics 5 is connected to a frequency measuring apparatus (not shown) for determining the frequency or the natural frequency of the LC resonant circuit 4. The measurement of permeability can be taken in a different manner by means of known methods. Here, it is advantageous to continuously measure the change of the oscillation period on the basis of the change of the impedance and of the resistance in the LC resonant circuit 4.

The evaluation electronics 5 delivers a continuous temperature signal or a temperature signal updated at discrete time intervals $T_{pwm}$, which is dependent on the set target power $P_s$, the actually recorded power $P_{act}$, the starting temperature of the coil 3, the starting temperature of the item of cookware, and the structure and material composition of the item of cookware. With use in an induction hob, the influences of the heating unit on the LC resonant circuit 4 or the measurements and measurement results can be minimised by the use of measures known to the technical experts or a person skilled in the art.

As input unit the cooking apparatus 1 has a control panel 6. A receiver/transmitter 8 for an external operating unit 12 and a receiver 9 for a temperature measuring probe 14 are connected and can be controlled via the controller 5 of the cooking apparatus 1. With the aid of antennas 10, the receiver 9 and the receiver/transmitter 8 can receive data from the temperature measuring probe 14 or can exchange data with the operating unit 12 via radio, infrared, Bluetooth or another wireless communication. The radio waves for the wireless data transfer are illustrated in FIG. 1 in each case by three circular segments arranged inside one another.

The cooking apparatus 1 has a bus system. The relevant data relating to the target power $P_s$, the effectively applied power $P_{act}$, the temperature signal $T_{pwm}$, and the ambient temperature $T_u$ are transferred via this bus system. The cooking areas 2 can be operated manually at the cooking apparatus 1 via a control panel 6 or via an external operating unit 12, such as a Smartphone.

The temperature is measured by the use of the temperature measuring probe 14, ideally wirelessly, which measures the temperature at the surface of the item of cookware $T_{pot}$ during the heating, without food to be cooked. Later, this temperature measuring probe 14 can also be used in the food to be cooked, as described for example in WO 2012/149997 A1, in order to determine further parameters of the food to be cooked and the progress of the cooking process.

For the structure of the temperature measuring probe 14, it is advantageous here to place a suitable temperature sensor (not shown) directly in the tip of the temperature measuring probe 14. The signal is processed in the temperature measuring probe 14 in order to then be transferred wirelessly to a corresponding, external evaluation electronics 5. However, an evaluation electronics may also be built-in directly in the temperature measuring probe 14. It is also conceivable for the external operating unit 12 to be integrated directly into the housing of the temperature measuring probe 14.

Figure 2:
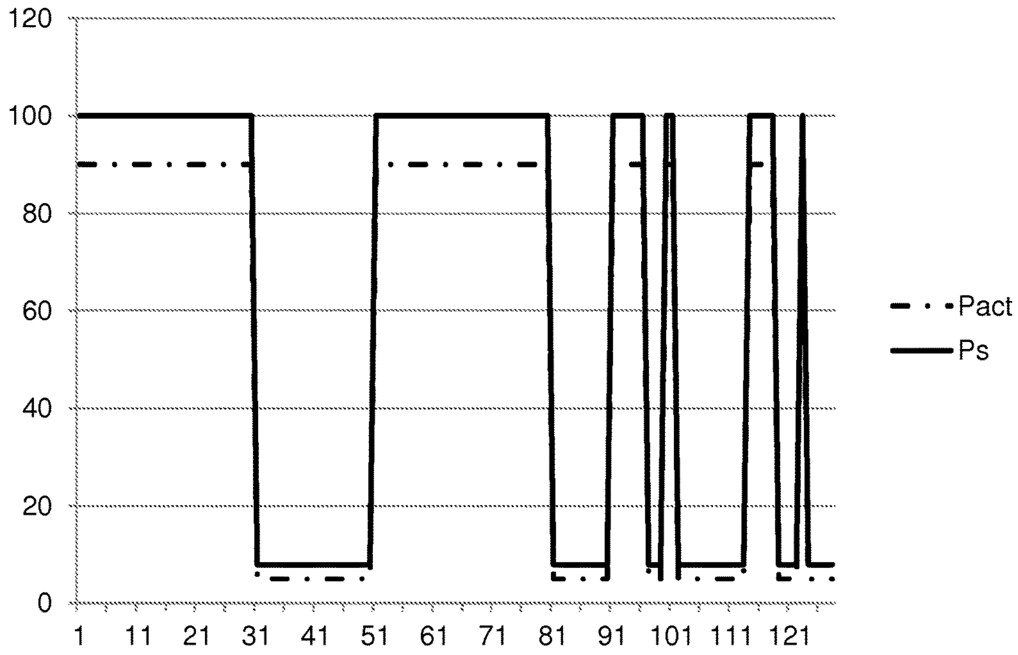
FIG. 2: shows a graph, in which the target power $P_s$ (solid line) and the effectively applied power $P_{act}$ (dashed line) are illustrated over time during a method according to the invention.
Figure 3:
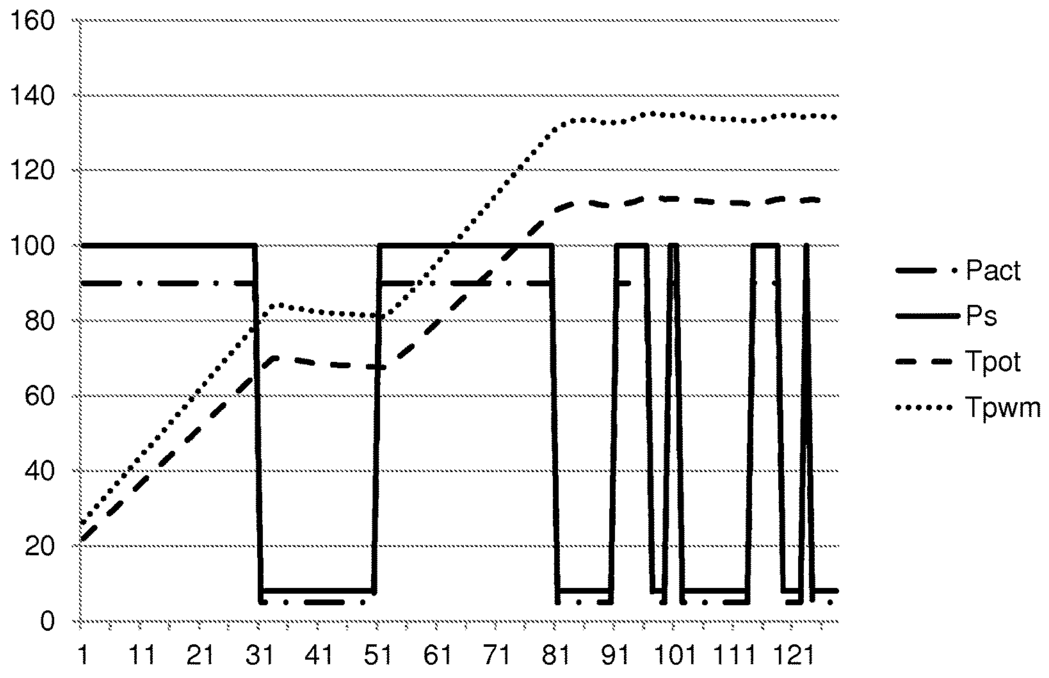
FIG. 3: shows a graph of the resultant temperature signal $T_{pwm}(t)$ (solid line) for a pan as item of cookware and the regulated item of cookware temperature $T_{pot}(t)$ (dashed line) over time t.

FIG. 2 shows a graph in which the target power $P_s$ (solid line) and the effectively applied power $P_{act}$ (dashed line) (as a percentage on the basis of the maximum power) are illustrated over time t (in seconds) during a method according to the invention, and FIG. 3 shows a graph of the resultant temperature signal $T_{pwm}(t)$ (solid line) for a pan as item of cookware and the regulated item of cookware temperature $T_{pot}(t)$ (in ° C.) over time t (in seconds).

The first heating cycle as described lasts 50 seconds, wherein the heating phase is 30 seconds and the cooling phase is 20 seconds. With the aid of the determined parameter or vector function or of the temperature measuring probe, heating is then performed to the target temperature, in this example to 110° C. This lasts for 30 seconds. This surface temperature $T_{pot}$ is then kept constant by means of the described regulation of the determined $T_{pwm}$ value for a certain period of time. It can be clearly seen how the $T_{pwm}$ value in this example correlates with the item of cookware temperature $T_{pot}$. The temperature signal $T_{pwm}$ resulting from the frequency of the LC resonant circuit can therefore be used to determine the temperature of the item of cookware or can be used directly to control the cooking process.

The features of the invention disclosed in the above description and in the claims, figures and exemplary embodiments may be essential both individually and in any combination for the implementation of the invention in its various embodiments.

LIST OF ABBREVIATIONS $T_{pwm}$ temperature signal $T_{pwm}(t_0)$, $P_1(t_0)$ temperature signal at the moment $t_0$ at predefined target power $P_1(t_0)$ $P_s$ target power of the cooking zone $P_{act}$ effective applied power of the cooking zone $T_{pot}$ temperature at the item of cookware surface or in the cooking medium $T_u$ ambient temperature t time $t_0$ moment 0

$t_n$ moment n, for example 50 sec after $t_0$ $t_{n+1}$ moment n+1, for example 55 sec $t_0$ $P_i$ actually $P_s$ at different stages, "wobble power", $T_{pot}(t)$, $T_u(t)$ temperature depending on time $T_{pot}(t)/T_{pot}(t)$ vector function or parameter function for the temperature at the item of cookware surface $f(T_{pwm})'$: $t_n$, $t_{n+1}$, $P_1$ first derivative of the temperature signal between 2 moments with a predefined, constant target power during this period of time $c_{pot}$ specific heat of the item of cookware, determined from the recorded work (integral over $P_s$) divided by the measured difference $T_{pot}$ $T_{pwm}(T_{pot})$ value for the temperature signal when a target temperature (measured or calculated) is reached.

LIST OF REFERENCE SIGNS

1 cooking apparatus
2 cooking area
3 coil/inductivity
4 LC resonant circuit
5 controller/microcontroller
6 control panel
8 operating unit receiver
9 temperature sensor receiver
10 antenna
12 operating unit
14 temperature measuring probe

The invention claimed is:

1. A method for regulating a cooking process using an item of cookware having inductive properties on a cooking area, wherein a coil is arranged as part of an LC resonant circuit in a region of the cooking area and a natural frequency of the LC resonant circuit is measured repeatedly or continuously, said method having the following method steps:

A) alternately heating the cooking area with at least two different target powers, wherein a first target power is held longer than a second target power, and wherein the first target power is selected to be higher than the second target power, wherein during this process a temperature at a bottom of the item of cookware is repeatedly or continuously measured using a temperature sensor to generate a measured temperature profile and said natural frequency of the LC resonant circuit is repeatedly or continuously measured;

B) determining a parameter function or vector function from the measured temperature profile over time of the temperature sensor and from the frequency of the LC resonant circuit depending on the time and depending on the least two target powers; and C) conducting the cooking process depending on the parameter function or vector function determined in method step B) and depending on the frequency of the LC resonant circuit and/or the change over time of the frequency of the LC resonant circuit.

2. The method according to claim 1, wherein an induction cooking zone is used as a cooking area, and an induction coil of the induction cooking zone or a separate coil is used as a coil.

3. The method according to claim 1, wherein with the alternate heating of the cooking area, at least one first target power is selected from 50% to 100% of a nominal power of the cooking area and at least one second target power is selected up to at most 25% of the nominal power of the cooking area.

4. The method according to claim 3, wherein the at least one second target power is selected up to at most 15% of the nominal power of the cooking area.

5. The method according to claim 1, wherein the temperature sensor after method step B) is no longer used to measure the temperature of the surface of the item of cookware.

6. The method according to claim 5, wherein the temperature sensor after method step B) the temperature sensor is detachable from the item of cookware and is removed from the item of cookware after method step B) or is placed in the food to be cooked or an instruction is provided to the user of the cooking apparatus, said instruction asking the user to remove the temperature sensor or to place said sensor in the food to be cooked.

7. The method according to claim 1, wherein the first target power is held longer than a second target power, and wherein the first target power is selected to be at least three times higher than the second target power.

8. The method according to claim 7, wherein the first target power is selected to be at least three times as high as the second target power.

9. The method according to claim 7, wherein the first target power is held between 30 and 120 seconds and the second target power is held between 15 and 60 seconds.

10. The method according to claim 1, wherein at least one variable selected from the group consisting of a profile over time of the temperature of the surface of the item of cookware measured using the temperature sensor, a profile over time of the measured power of the cooking area, a profile over time of the target power of the cooking area, and a profile over time of the frequency of the LC resonant circuit, or at least one of a first time derivative and a second time derivative of at least one said variable is used to determine the parameter function or vector function.

11. The method according to claim 1, wherein at least one variable selected from the group consisting of a profile over time of the measured power of the cooking area, a profile over time of the target power of the cooking area, and a profile over time of the frequency of the LC resonant circuit, or at least one of a first time derivative and a second time derivative of at least one said variable is used to conduct the cooking process depending on the frequency of the LC resonant circuit.

12. The method according to claim 1, wherein each determined parameter function or vector function is assigned to an item of cookware or a class of cookware, and the cooking process is conducted depending on the parameter function or vector function.

13. The method according to claim 12, wherein each determined parameter function or vector function is stored together with a labelling for the item of cookware or the class of cookware in an electronic memory.

14. The method according to claim 1, wherein after method step B) the item of cookware is heated to a first target temperature, wherein the temperature sensor and/or the frequency of the LC resonant circuit and/or the parameter or vector function for determining the current temperature of the item of cookware is used for this purpose.

15. The method according to claim 14, wherein different values are stored for the frequency of the LC resonant circuit or a variable calculated or derived therefrom, and the stored values or the variable is used as a reference for subsequent regulations on the basis of the frequency of the LC resonant circuit.

16. The method according to claim 1, wherein the temperature sensor, after reaching the target temperature, is removed from the item of cookware or placed in a food to be cooked, or an instruction is provided to the user of the cooking apparatus, asking the user to remove the temperature sensor or to place the temperature sensor in the food to be cooked.

17. The method according to claim 1, wherein in the event of a maintaining phase of the cooking process, in which the temperature of the item of cookware is to be kept constant, a two-point regulation or a multi-point regulation is used, wherein the at least two target powers in method step A) are used as power stages for the two-point regulation or multi-point regulation and the temperature is determined several times by calculation using the parameter function or the vector function from the measured frequency of the LC resonant circuit.

18. The method according to claim 1, wherein by evaluation of the frequency of the LC resonant circuit with the parameter function or the vector function, it is determined whether a food to be cooked or a cooking medium is introduced into the item of cookware during the cooking process, whether the food to be cooked is burning, whether the cooking medium is overcooking, whether the position of the item of cookware on the cooking area has changed and/or the manner in which the food to be cooked is arranged physically in the item of cookware, and the cooking process is controlled in accordance with this determination and/or an instruction is provided to the user of the cooking apparatus.

19. The method according to claim 1, wherein the cooking process is selectively controlled by an adjustment of the power of the cooking area depending on the progress of the cooking process, a target time and/or the desired result, wherein, to determine the temperature of the item of cookware, the frequency of the LC resonant circuit is used with application of the parameter function or the vector function for calculation of the temperature.

20. The method according to claim 1, wherein the method with method steps A) and B) is used to calibrate the item of cookware, wherein the parameter function or the vector function is stored, and when an item of cookware is placed on the cooking area (2) with method steps A) and B) a known item of cookware is identified on the basis of the parameter function or vector function and the previously stored parameter function or vector function is used to conduct the cooking process during the evaluation of the frequency of the LC resonant circuit in method step C).

21. A cooking apparatus comprising:

(a) at least one cooking area, (b) a temperature sensor, (c) a power controller, (d) an LC resonant circuit having a coil arranged in a region of the at least one cooking area, and (e) a controller connected to the temperature sensor and to a unit for measuring a frequency of the LC resonant circuit and programmed to carry out a method for regulating a cooking process using an item of cookware having inductive properties on the at least one cooking area, the LC resonant circuit having a natural frequency, said method having the following method steps:

i) alternately heating the cooking area with at least two different target powers, wherein a first target power is held longer than a second target power, and wherein the first target power is selected to be higher than the second target power, repeatedly or continuously measuring a temperature at a bottom of an item of cookware being heated using the temperature sensor to generate a measured temperature profile, and repeatedly or continuously measuring said natural frequency of the LC resonant circuit;

ii) determining a parameter function or a vector function from the measured temperature profile over time of the temperature sensor and from the frequency of the LC resonant circuit depending on the time and depending on the least two target powers; and iii) conducting the cooking process depending on the parameter function or the vector function determined in method step ii) and depending on the frequency of the LC resonant circuit and/or the change over time of the frequency of the LC resonant circuit, wherein the controller has access to a memory for storing the mathematically determined parameter function or vector function for determining the temperature of an object.

22. The cooking apparatus according to claim 21, wherein the cooking apparatus has a temperature measuring probe, which is connected wirelessly to the controller and at a tip of which the temperature sensor for measuring the surface temperature of an item of cookware is arranged.

23. A cooking apparatus according to claim 21, wherein said at least one cooking area is at least one induction cooking zone.

* * * * *